US012793596B2

(12) United States Patent
Kim et al.

(10) Patent No.: US 12,793,596 B2
(45) Date of Patent: Nov. 10, 2026

(54) DISPLAY DEVICE WITH DYNAMIC EMISSION CYCLE CONTROL, AND ELECTRONIC APPARATUS INCLUDING THE SAME

(71) Applicant: SAMSUNG DISPLAY CO., LTD., Yongin-si (KR)

(72) Inventors: Taehyung Kim, Yongin-si (KR); Yong-Sik Jung, Yongin-si (KR); Heebeom Yang, Yongin-si (KR); Hyun Sik Hwang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/926,738

(22) Filed: Oct. 25, 2024

(65) Prior Publication Data

US 2025/0140156 A1 May 1, 2025

(30) Foreign Application Priority Data

Oct. 27, 2023 (KR) ........................ 10-2023-0146108

(51) Int. Cl.
*G09G 3/20* (2006.01)
*G09G 3/32* (2016.01)
*G09G 3/3233* (2016.01)

(52) U.S. Cl.
CPC ............. *G09G 3/2029* (2013.01); *G09G 3/32* (2013.01); *G09G 3/3233* (2013.01);
(Continued)

(58) Field of Classification Search
CPC .......... G09G 3/2014–2029; G09G 3/30–3291; G09G 2300/0819; G09G 2300/0861;
(Continued)

(56) References Cited

U.S. PATENT DOCUMENTS

2018/0151132 A1* 5/2018 Lee ...................... G09G 3/2018
2019/0080645 A1* 3/2019 Chaji ...................... H01L 22/24
(Continued)

FOREIGN PATENT DOCUMENTS

KR 10-0857672 B1 9/2008
KR 10-2032358 B1 10/2019
(Continued)

OTHER PUBLICATIONS

Extended European Search Report dated Feb. 27, 2025 from the European Patent Office for corresponding European Patent Application No. 24206392.3.

*Primary Examiner* — Keith L Crawley
(74) *Attorney, Agent, or Firm* — F. CHAU & ASSOCIATES, LLC

(57) ABSTRACT

A display device includes a display panel including a pixel and an emission line connected to the pixel, an emission driver which provides an emission signal defining emission periods and non-emission periods to the emission line, and a controller which determines an emission cycle corresponding to a number of the discontinuous emission periods during a frame period and an emission-off ratio which is a ratio of a sum of the non-emission periods to the frame period. An $n^{th}$ frame period between an $n-1^{th}$ frame period and an $n+1^{th}$ frame period in which the emission cycles are different and the emission-off ratios are equal includes first to $m^{th}$ sub-frame periods in which the emission-off ratios are different.

19 Claims, 12 Drawing Sheets

(52) U.S. Cl.
CPC ............... *G09G 2300/0819* (2013.01); *G09G 2300/0861* (2013.01); *G09G 2310/08* (2013.01); *G09G 2320/0247* (2013.01); *G09G 2320/045* (2013.01)

(58) Field of Classification Search
CPC ......... G09G 2310/067; G09G 2310/08; G09G 2320/0233; G09G 2320/0247; G09G 2320/045; G09G 2320/064–0653
See application file for complete search history.

(56) References Cited

U.S. PATENT DOCUMENTS

| | | | | |
|---|---|---|---|---|
| 2020/0286429 | A1 | 9/2020 | Orio et al. | |
| 2020/0335061 | A1* | 10/2020 | An | G09G 5/10 |
| 2021/0201793 | A1* | 7/2021 | Lin | G09G 3/3233 |
| 2022/0036814 | A1* | 2/2022 | Hwang | G09G 3/3233 |
| 2022/0068224 | A1 | 3/2022 | Park et al. | |
| 2023/0075226 | A1* | 3/2023 | Lee | G09G 3/2096 |
| 2023/0351960 | A1* | 11/2023 | Nakamura | G09G 3/3266 |
| 2024/0161671 | A1* | 5/2024 | Sun | G09G 3/3233 |
| 2024/0346992 | A1* | 10/2024 | Zhang | G09G 3/32 |

FOREIGN PATENT DOCUMENTS

| | | | |
|---|---|---|---|
| KR | 10-2022-0030508 | A | 3/2022 |
| WO | 2021152814 | A1 | 8/2021 |

* cited by examiner

DISPLAY DEVICE WITH DYNAMIC EMISSION CYCLE CONTROL, AND ELECTRONIC APPARATUS INCLUDING THE SAME

CROSS-REFERENCE TO RELATED APPLICATION(S)

This application claims priority under 35 U.S.C. § 119 to Korean Patent Application No. 10-2023-0146108, filed on Oct. 27, 2023, the disclosure of which is incorporated by reference herein in its entirety.

TECHNICAL FIELD

Embodiments of the present disclosure relate to a display device. More particularly, embodiments of the present disclosure relate to a display device having improved image quality.

DISCUSSION OF RELATED ART

A display device may display images having different luminances for frame periods. A frame period may include at least one emission period, and a pixel included in the display device may emit light in the emission period.

An emission cycle corresponding to the number of discontinuous emission periods during one frame period may be changed between adjacent frame periods. When the emission cycle is changed, flashing in which a luminance of an image displayed by the display device momentarily increases or decreases may occur. When this flashing occurs in the image, an image quality of the display device may deteriorate.

SUMMARY

Embodiments of the present disclosure provide a display device having improved image quality.

A display device according to embodiments of the present disclosure includes a display panel including a pixel and an emission line connected to the pixel, and an emission driver which provides an emission signal to the emission line. The emission signal defines discontinuous emission periods and non-emission periods during a frame period among a plurality of frame periods. The display device further includes a controller which determines an emission cycle corresponding to a number of the discontinuous emission periods during the frame period and an emission-off ratio which is a ratio of a sum of the non-emission periods to the frame period. The plurality of frame periods includes an $n-1^{th}$ frame period, an $n+1^{th}$ frame period, and an $n^{th}$ frame period between the $n-1^{th}$ frame period and the $n+1^{th}$ frame period. The emission cycle of the $n-1^{th}$ frame period is different from the emission cycle of the $n+1^{th}$ frame period, the emission-off ratio of the $n-1^{th}$ frame period is equal to the emission-off ratio of the $n+1^{th}$ frame period, and the $n^{th}$ frame period includes first to $m^{th}$ sub-frame periods having different emission-off ratios. Each of m and n is a positive integer greater than 1.

In an embodiment, the emission-off ratios of the first to $m^{th}$ sub-frame periods decreases from the first sub-frame period to the $m^{th}$ sub-frame period when the emission cycle of the $n+1^{th}$ frame period is greater than the emission cycle of the $n-1^{th}$ frame period.

In an embodiment, the emission-off ratio of the first sub-frame period is greater than the emission-off ratio of the $n-1^{th}$ frame period.

In an embodiment, the emission-off ratios of the first to $m^{th}$ sub-frame periods increases from the first sub-frame period to the $m^{th}$ sub-frame period when the emission cycle of the $n+1^{th}$ frame period is less than the emission cycle of the $n-1^{th}$ frame period.

In an embodiment, the emission-off ratio of the $m^{th}$ sub-frame period is greater than the emission-off ratio of the $n+1^{th}$ frame period.

In an embodiment, the emission cycle of the $n^{th}$ frame period is equal to the emission cycle of a frame period with the greater emission cycle among the $n-1^{th}$ frame period and the $n+1^{th}$ frame period.

In an embodiment, emission cycles of the first to $m^{th}$ sub-frame periods are different.

In an embodiment, the emission cycles increase from the first sub-frame period to the $m^{th}$ sub-frame period when the emission cycle of the $n+1^{th}$ frame period is greater than the emission cycle of the $n-1^{th}$ frame period.

In an embodiment, the emission-off ratio of the first sub-frame period is greater than the emission-off ratio of the $n-1^{th}$ frame period.

In an embodiment, the emission cycle of the first sub-frame period is greater than the emission cycle of the $n-1^{th}$ frame period, and the emission cycle of the $m^{th}$ sub-frame period is less than the emission cycle of the $n+1^{th}$ frame period.

In an embodiment, the emission cycles of the first to $m^{th}$ sub-frame periods decrease from the first sub-frame period to the $m^{th}$ sub-frame period when the emission cycle of the $n+1^{th}$ frame period is less than the emission cycle of the $n-1^{th}$ frame period.

In an embodiment, the emission-off ratio of the $m^{th}$ sub-frame period is greater than the emission-off ratio of the $n+1^{th}$ frame period.

In an embodiment, the emission cycle of the first sub-frame period is less than the emission cycle of the $n-1^{th}$ frame period, and the emission cycle of the $m^{th}$ sub-frame period is greater than the emission cycle of the $n+1^{th}$ frame period.

In an embodiment, the emission cycle of the $n^{th}$ frame period is between the emission cycle of the $n-1^{th}$ frame period and the emission cycle of the $n+1^{th}$ frame period.

In an embodiment, the emission cycle of one of the $n-1^{th}$ frame period and the $n+1^{th}$ frame period is 1, and the emission cycle of another of the $n-1^{th}$ frame period and the $n+1^{th}$ frame period may be 12, 16, 24, or 32.

In an embodiment, luminances of the $n-1^{th}$ and $n+1^{th}$ frame periods are equal.

A display device according to embodiments of the present disclosure includes a display panel including a pixel and an emission line connected to the pixel, and an emission driver which provides an emission signal to the emission line The emission signal defines discontinuous emission periods and non-emission periods during a frame period among a plurality of frame periods. The display device further includes a controller which determines an emission cycle corresponding to a number of the discontinuous emission periods during the frame period and an emission-off ratio which is a ratio of a sum of the non-emission periods to the frame period. A first frame period has a first emission cycle, a second frame period adjacent to the first frame period has a second emission cycle greater than the first emission cycle, and a length of a non-emission period of the first frame period is equal to a length of a non-emission period of the second frame period.

In an embodiment, the first frame period has a first emission-off ratio which is a minimum emission-off ratio, and the second frame period has a second emission-off ratio greater than the first emission-off ratio.

In an embodiment, a magnitude of a data voltage of the first frame period is less than a magnitude of a data voltage of the second frame period.

In an embodiment, the first emission cycle is 1, and the second emission cycle is 12, 16, 24, or 32.

In the display device according to embodiments of the present disclosure, when the emission cycle is changed between the adjacent frame periods, a buffer frame period including sub-frame periods having different emission-off ratios may be inserted between the adjacent frame periods, or lengths of non-emission periods of the adjacent frame periods may be equal.

Accordingly, the flashing of the image displayed by the display device may not occur although a difference in the emission cycles between the adjacent frame periods is large.

BRIEF DESCRIPTION OF THE DRAWINGS

The above and other features of the present disclosure will become more apparent by describing in detail embodiments thereof with reference to the accompanying drawings.

DETAILED DESCRIPTION OF THE EMBODIMENTS

Figure 1:
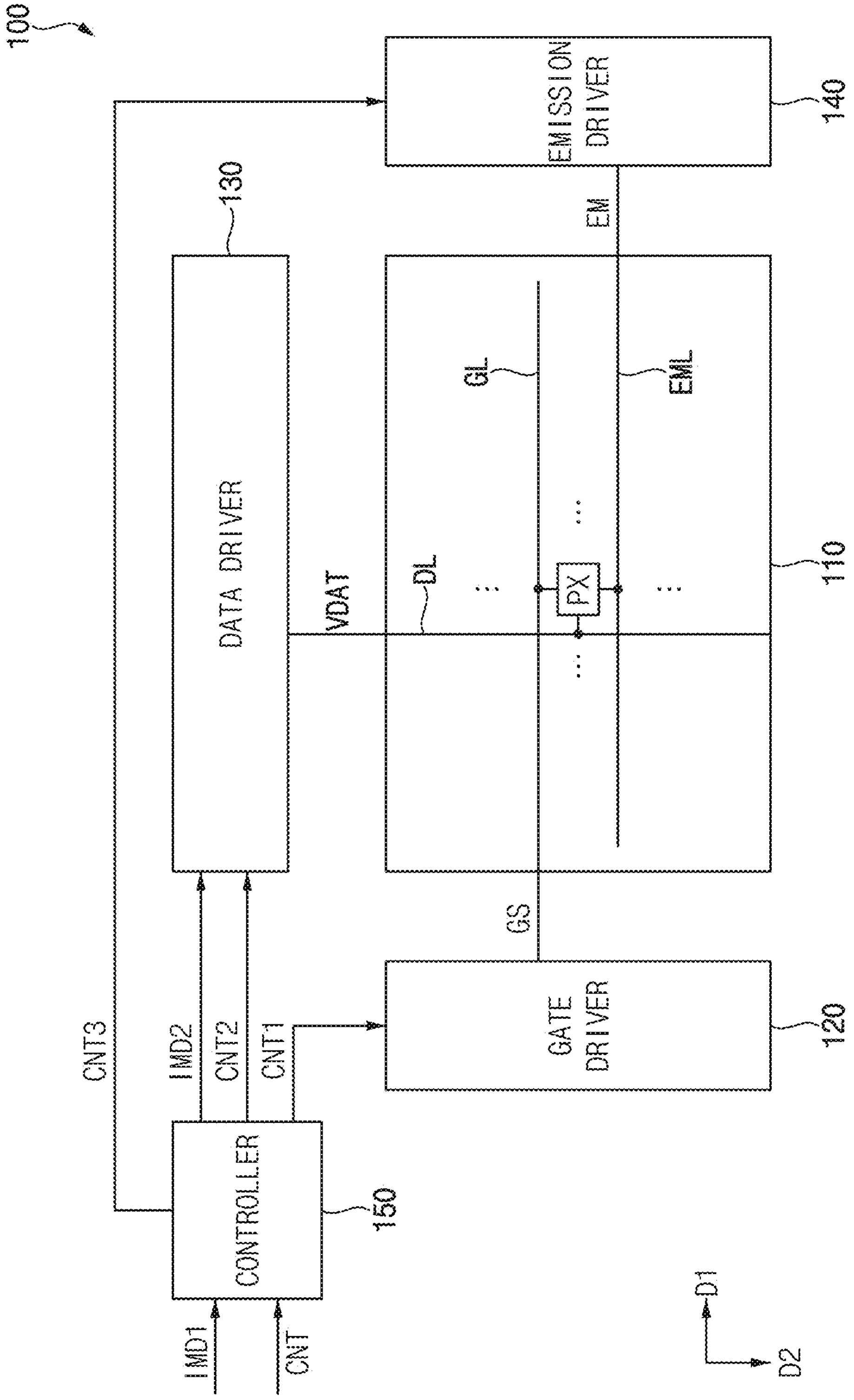
FIG. 1 is a block diagram showing a display device according to an embodiment.

Hereinafter, a display device according to embodiments of the present disclosure will be described in more detail with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

FIG. 1 is a block diagram showing a display device 100 according to an embodiment.

Referring to FIG. 1, a display device 100 may include a display panel 110, a gate driver 120 (also referred to as a gate driver circuit), a data driver 130 (also referred to as a data driver circuit), an emission driver 140 (also referred to as an emission driver circuit), and a controller 150 (also referred to as a controller circuit).

The display panel 110 may include a plurality of pixels PX, a plurality of gate lines GL, a plurality of data lines DL, and a plurality of emission lines EML.

The pixels PX may include pixels that emit light of multiple colors. In an embodiment, the pixels PX may include red pixels that emit red light, green pixels that emit green light, and blue pixels that emit blue light.

The gate lines GL may be connected to the pixels PX. The gate lines GL may extend in a first direction D1 and be arranged in a second direction D2 crossing the first direction D1. The gate lines GL may provide gate signals GS to the pixels PX.

The data lines DL may be connected to the pixels PX. The data lines DL may extend in the second direction D2 and be arranged in the first direction D1. The data lines DL may provide data voltages VDAT to the pixels PX.

The emission lines EML may be connected to the pixels PX. The emission lines EML may extend in the first direction D1 and be arranged in the second direction D2. The emission lines EML may provide emission signals EM to the pixels PX.

The gate driver 120 may provide the gate signals GS to the gate lines GL. The gate driver 120 may generate the gate signals GS based on a first control signal CNT1. The first control signal CNT1 may include, for example, a gate start signal, a gate clock signal, etc.

The data driver 130 may provide the data voltages VDAT to the data lines DL. The data driver 130 may generate the data voltages VDAT based on output image data IMD2 and a second control signal CNT2. The output image data IMD2 may include output grayscale values corresponding to the pixels PX. The second control signal CNT2 may include, for example, a load signal, a data clock signal, etc.

The emission driver 140 may provide the emission signals EM to the emission lines EML.

The emission driver 140 may generate the emission signals EM based on a third control signal CNT3. The third control signal CNT3 may include, for example, an emission start signal, an emission clock signal, etc.

The controller 150 may control an operation (or driving) of the gate driver 120, an operation (or driving) of the data driver 130, and an operation (or driving) of the emission driver 140. The controller 150 may receive input image data EVID1 and a control signal CNT from a host (e.g., processor). The input image data IMD1 may include input grayscale values corresponding to the pixels PX. The control signal CNT may include, for example, a clock signal, a vertical synchronization signal, a horizontal synchronization signal, a data enable signal, etc. The controller 150 may provide the first control signal CNT1 to the gate driver 120, provide the output image data IMD2 and the second control signal CNT2 to the data driver 130, and provide the third control signal CNT3 to the emission driver 140. The controller 150 may generate the first to third control signals CNT1, CNT2, and CNT3 based on the control signal CNT, and generate the output image data ID2 based on the input image data MID1.

Figure 2:
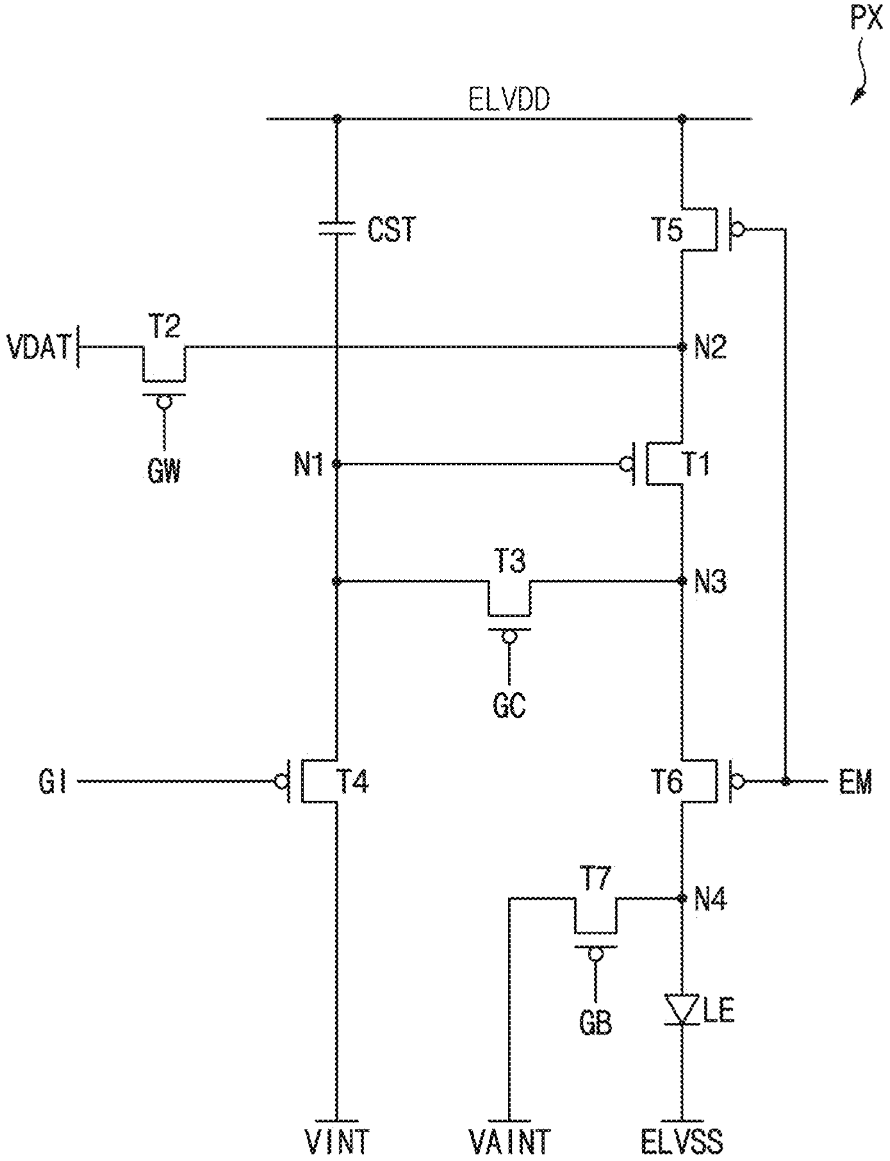
FIG. 2 is a circuit diagram showing a pixel included in the display device of FIG. 1.

FIG. 2 is a circuit diagram showing a pixel PX included in the display device 100 of FIG. 1.

Referring to FIG. 2, the pixel PX may include a first transistor T1, a second transistor T2, a third transistor T3, a fourth transistor T4, a fifth transistor T5, a sixth transistor T6, a seventh transistor T7, a storage capacitor CST, and a light emitting diode LE. The gate signal (GS in FIG. 1) may include a first gate signal GW (or write gate signal), a second gate signal GC (or compensation gate signal), a third gate signal GI (or initialization gate signal), and a fourth gate signal GB (or bypass gate signal).

The first transistor T1 may include a gate electrode connected to a first node N1, a first electrode connected to a second node N2, and a second electrode connected to a third node N3. The first transistor T1 may be referred as a driving transistor.

The second transistor T2 may include a gate electrode that receives the first gate signal GW, a first electrode that receives the data voltage VDAT, and a second electrode connected to the second node N2. The second transistor T2 may be referred as a write transistor.

The third transistor T3 may include a gate electrode that receives the second gate signal GC, a first electrode connected to the third node N3, and a second electrode connected to the first node N1. The third transistor T3 may be referred as a compensation transistor.

The fourth transistor T4 may include a gate electrode that receives the third gate signal GI, a first electrode that receives a first initialization voltage VINT, and a second electrode connected to the first node N1. The fourth transistor T4 may be referred as an initialization transistor.

The fifth transistor T5 may include a gate electrode that receives the emission signal EM, a first electrode that receives a first power voltage ELVDD, and a second electrode connected to the second node N2. The fifth transistor T5 may be referred to as a first light emitting transistor.

The sixth transistor T6 may include a gate electrode that receives the emission signal EM, a first electrode connected to the third node N3, and a second electrode connected to a fourth node N4. The sixth transistor T6 may be referred to as a second light emitting transistor.

The seventh transistor T7 may include a gate electrode that receives the fourth gate signal GB, a first electrode that receives a second initialization voltage VAINT, and a second electrode connected to the fourth node N4. The seventh transistor T7 may be referred as a bypass transistor.

FIG. 2 shows an embodiment in which each of the first transistor T1, the second transistor T2, the third transistor T3, the fourth transistor T4, the fifth transistor T5, the sixth transistor T6, and the seventh transistor T7 is a P-type transistor (e.g., PMOS transistor), but the present disclosure is not limited thereto. For example, in an embodiment, at least one of the first transistor T1, the second transistor T2, the third transistor T3, the fourth transistor T4, the fifth transistor T5, the sixth transistor T6, and the seventh transistor T7 may be an N-type transistor (e.g., NMOS transistor).

The storage capacitor CST may include a first electrode connected to the first node N1 and a second electrode that receives the first power voltage ELVDD.

FIG. 2 shows that the pixel PX includes seven transistors T1, T2, T3, T4, T5, T6, and T7 and one capacitor CST, but the present disclosure is not limited thereto. For example, in an embodiment, the pixel PX may include 2 to 6 transistors, 8 or more transistors, and/or 2 or more capacitors.

The light emitting diode LE may include a first electrode (or anode) connected to the fourth node N4 and a second electrode (or cathode) that receives a second power voltage ELVSS. In an embodiment, the light emitting diode LE may be an organic light emitting diode. In an embodiment, the light emitting diode LE may be, for example, an inorganic light emitting diode, a quantum-dot light emitting diode, or a micro light emitting diode.

Figure 3:
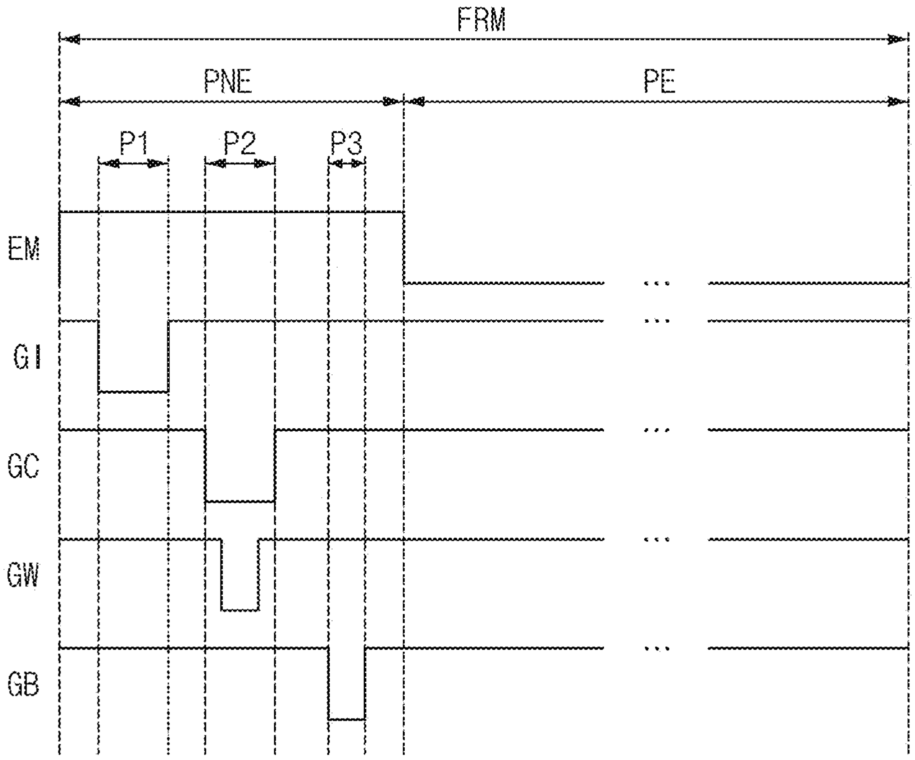
FIG. 3 is a timing diagram showing signals provided to the pixel of FIG. 2.

FIG. 3 is a timing diagram showing signals provided to the pixel PX of FIG. 2.

Referring to FIGS. 2 and 3, a frame period FRM in which one frame of an image is displayed may include at least one non-emission period PNE and at least one emission period PE. The non-emission period PNE may be defined by a turn-off voltage (e.g., logic high voltage) of the emission signal EM, and the emission period PE may be defined by a turn-on voltage (e.g., logic low voltage) of the emission signal EM.

In an embodiment, in the non-emission period PNE, the light emitting diode LE does not emit light. The non-emission period PNE may include a first period P1 (or initialization period), a second period P2 (or compensation and writing period), and a third period P3 (or bypass period).

In the first period P1, the fourth transistor T4 may be turned on in response to a turn-on voltage of the third gate signal GI, and the first initialization voltage VINT may be applied to the first node N1. Accordingly, the first node N1 may be initialized.

In the second period P2, the third transistor T3 may be turned on in response to a turn-on voltage of the second gate signal GC, and the first transistor T1 may be diode-connected. Further, the second transistor T2 may be turned on in response to a turn-on voltage of the first gate signal GW, and the data voltage VDAT for which a threshold voltage of the first transistor T1 is compensated may be applied to the first node N1. Accordingly, the data voltage VDAT for which the threshold voltage of the first transistor T1 is compensated may be written to the first node N1.

In the third period P3, the seventh transistor T7 may be turned on in response to a turn-on voltage of the fourth gate signal GB, and the second initialization voltage VAINT may be applied to the fourth node N4. Accordingly, the fourth node N4 may be initialized.

The light emitting diode LE may emit light in the emission period PE. The fifth transistor T5 and the sixth transistor T6 may be turned on in response to the turn-on voltage of the emission signal EM in the emission period PE, and a current path of a driving current generated in the first transistor T1 may be formed from the first power voltage ELVDD to the second power voltage ELVSS. Accordingly, the light emitting diode LE may emit light with a luminance corresponding to the driving current.

Figure 4:
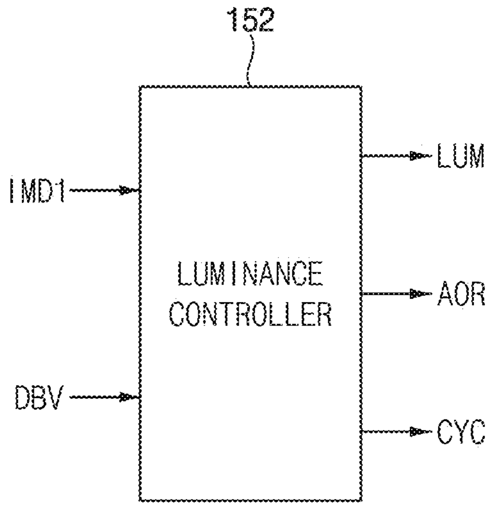
FIG. 4 is a block diagram showing a luminance controller included in a controller of FIG. 1.

FIG. 4 is a block diagram showing a luminance controller 152 included in the controller 150 of FIG. 1.

Referring to FIGS. 1 and 4, a luminance controller 152 may determine a luminance LUM of an image based on the input grayscale values of the input image data IMD1 and a dimming level DBV, and determine an emission-off ratio AOR and an emission cycle CYC based on the luminance LUM of the image.

The luminance LUM of the image may be determined based on the dimming level DBV. The dimming level DBV may be set by a user or set by detecting an ambient illuminance. For example, the luminance controller 152 may receive the dimming level DBV from a host.

The emission-off ratio AOR may be a ratio of the sum of non-emission periods to one frame period. For example, the emission-off ratio AOR may be a value obtained by dividing the frame period (FRM in FIG. 3) including the non-emission periods (PNE in FIG. 3) and the emission periods (PE in FIG. 3) by the sum of the non-emission periods PNE.

The emission cycle CYC may correspond to the number of discontinuous emission periods during one frame period. For example, the emission cycle CYC may correspond to the number of pulses defined by a falling edge, a turn-on voltage, and a rising edge of the emission signal (EM in FIG. 3) within the frame period FRM.

The controller 150 may generate the emission start signal included in the third control signal CNT3 based on the emission-off ratio AOR and the emission cycle CYC, and the emission driver 140 may generate the emission signal EM based on the third control signal CNT3.

Figure 5:
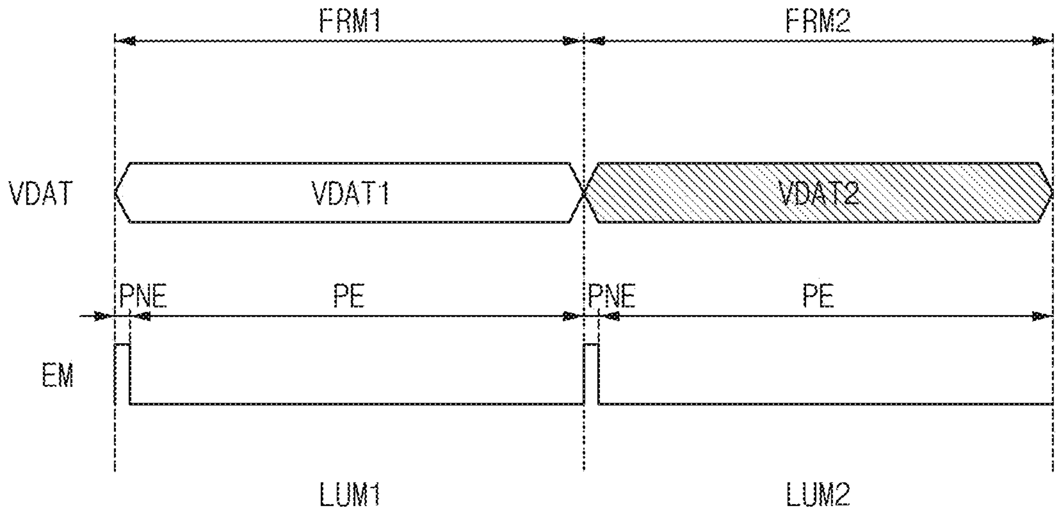
FIG. 5 is a view for describing a data dimming scheme.

FIG. 5 is a view for describing a data dimming scheme.

Referring to FIGS. 4 and 5, when the luminance LUM of the image is included in a first luminance range (or high luminance range), the luminance controller 152 may control the luminance LUM by changing the data voltage VDAT while maintaining the emission-off ratio AOR constant. Controlling the luminance LUM by changing the data voltage VDAT while maintaining the emission-off ratio AOR constant may be referred as a data dimming scheme. When the luminance LUM is included in the first luminance range, the emission cycle CYC may be 1. In an embodiment, the emission-off ratio AOR may be a minimum emission-off ratio. For example, the minimum emission-off ratio may be 1%. For example, the first luminance range may be about 500 nits to about 110 nits.

When the image has a first luminance LUM1 included in the first luminance range in a first frame period FRM1, the luminance controller 152 may set the data voltage VDAT to a first data voltage VDAT1 while maintaining the emission-off ratio AOR at the minimum emission-off ratio in the first frame period FRM1.

When the image has a second luminance LUM2 included in the first luminance range and lower than the first luminance LUM1 in a second frame period FRM2, the luminance controller 152 may set the data voltage VDAT to a second data voltage VDAT2 while maintaining the emission-off ratio AOR at the minimum emission-off ratio in the second frame period FRM2. A magnitude of the second data voltage VDAT2 may be less than a magnitude of the first data voltage VDAT1. Accordingly, the second luminance LUM2 of the image in the second frame period FRM2 may be lower than the first luminance LUM1 of the image in the first frame period FRM1.

Figure 6:
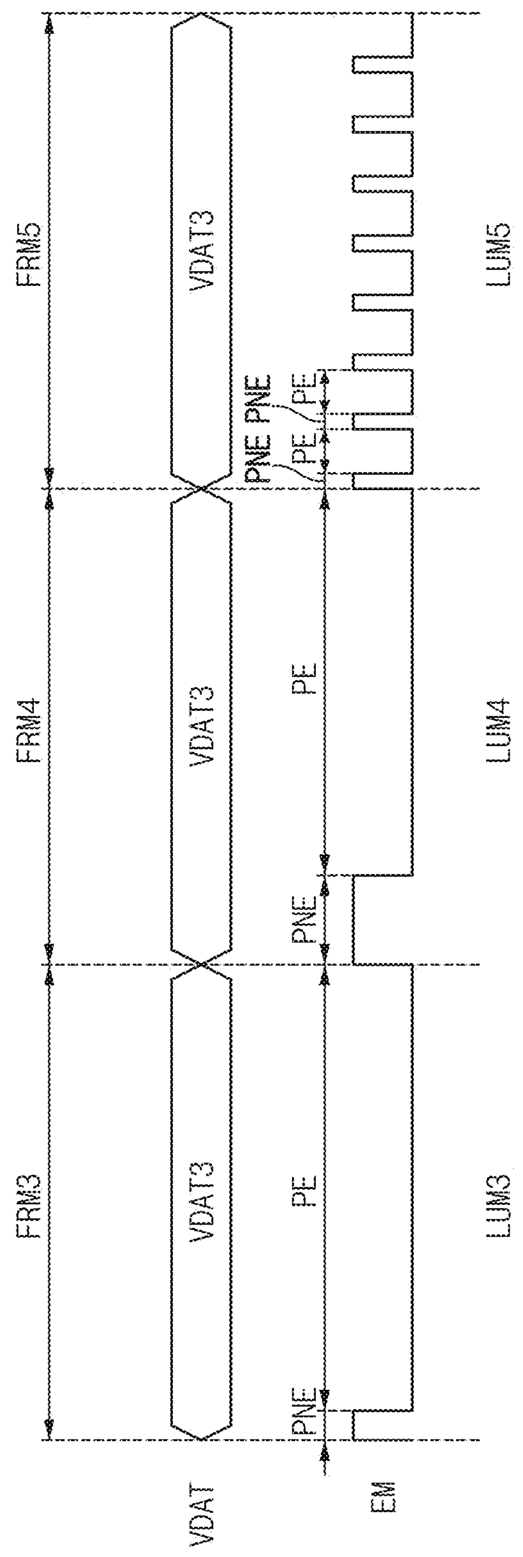
FIG. 6 is a view for describing a pulse width modulation (PWM) dimming scheme.

FIG. 6 is a view for describing a pulse width modulation (PWM) dimming scheme.

Referring to FIGS. 4 and 6, when the luminance LUM of the image is included in a second luminance range (or middle luminance range) or a third luminance range (or low luminance range), the luminance controller 152 may control the luminance LUM by changing the emission-off ratio AOR while maintaining the data voltage VDAT constant. Controlling the luminance LUM by changing the emission-off ratio AOR while maintaining the data voltage VDAT constant may be referred as a PWM dimming scheme. When the luminance LUM is included in the second luminance range, the emission cycle CYC may be 1. For example, the second luminance range may be from about 110 nits to about 80 nits, and the third luminance range may be from about 80 nits to about 0 nits.

When the image has a third luminance LUM3 included in the second luminance range in a third frame period FRM3 and the image has a fourth luminance LUM4 included in the second luminance range and lower than the third luminance LUM3 in a fourth frame period FRM4, the luminance controller 152 may increase the emission-off ratio AOR while maintaining the data voltage VDAT at the third data voltage VDAT3 of the third frame period FRM3 in the fourth frame period FRM4. In other words, the luminance controller 152 may increase a length of the non-emission period PNE in the fourth frame period FRM4. Accordingly, the emission-off ratio AOR (or a length of the non-emission period PNE) in the fourth frame period FRM4 may be greater than the emission-off ratio AOR (or the non-emission period PNE) in the third frame period FRM3. Accordingly, the fourth luminance LUM4 of the image in the fourth frame period FRM4 may be lower than the third luminance LUM3 of the image in the third frame period FRM3.

When the image has a fifth luminance LUM5 included in the third luminance range and lower than the fourth luminance LUM4 in a fifth frame period FRM5, the luminance controller 152 may increase the emission-off ratio AOR while maintaining the data voltage VDAT at the third data voltage VDAT3 in the fifth frame period FRM5. In other words, the luminance controller 152 may increase the sum of lengths of the non-emission periods PNE in the fifth frame period FRM5. Further, the luminance controller 152 may increase the emission cycle CYC in the fifth frame period FRM5. When the luminance LUM is included in the third luminance range, the emission cycle CYC may be greater than 1. Accordingly, the emission-off ratio AOR (or the sum of the lengths of the non-emission periods PNE) in the fifth frame period FRM5 may be greater than the emission-off ratio AOR (or the length of the non-emission period PNE) in the fourth frame period FRM4, and the emission cycle CYC in the fifth frame period FRM5 may be greater than the emission cycle CYC in the fourth frame period FRM4. Accordingly, the fifth luminance LUM5 of the image in the fifth frame period FRM5 may be lower than the fourth luminance LUM4 of the image in the fourth frame period FRM4. Further, the emission cycle CYC may increase in the fifth frame period FRM5 in which the image having the fifth luminance LUM5 included in the third luminance range, which is a low luminance range, is displayed, and a flicker may be prevented from being recognized in a low luminance image.

Figure 7:
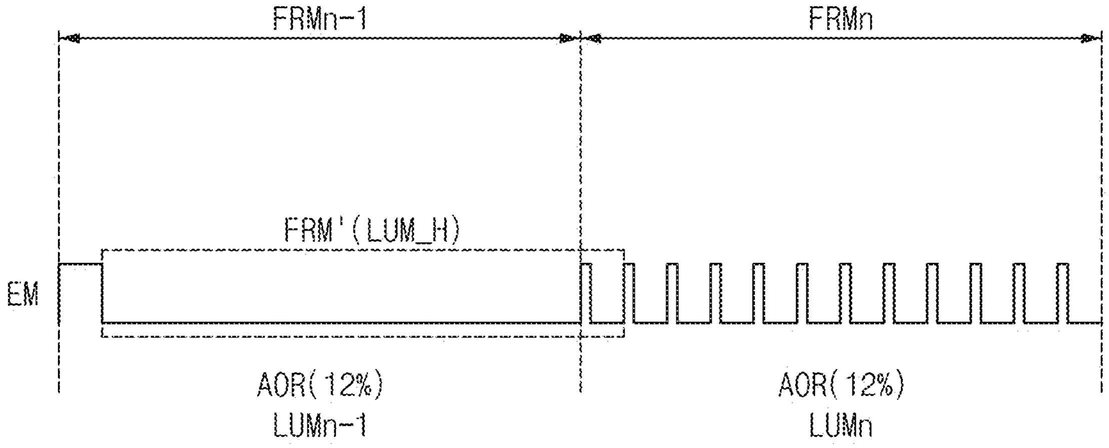
FIGS. 7 and 8 are views for describing a change in emission cycle according to a comparative example.
Figure 8:
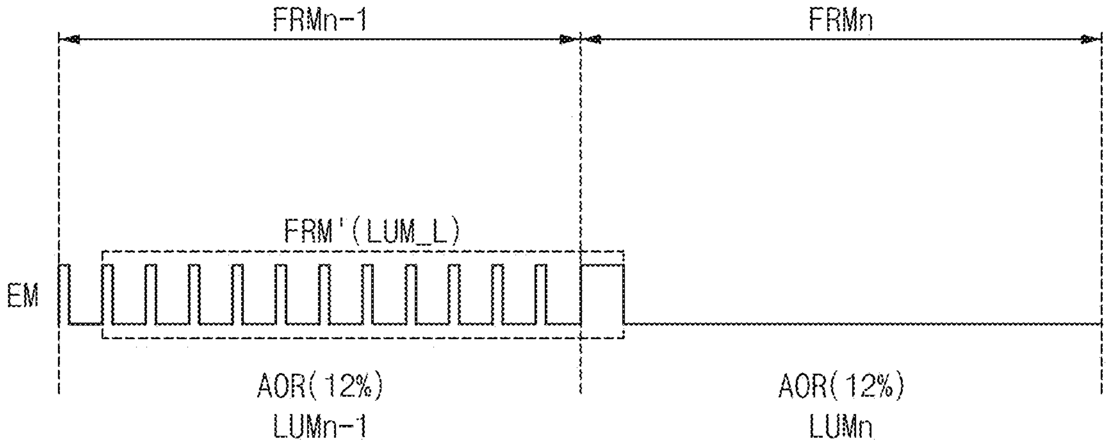

FIGS. 7 and 8 are views for describing a change in emission cycle CYC according to a comparative example.

Referring to FIGS. 7 and 8, in a comparative example, when the emission cycle CYC changes between an n−1$^{th}$ (where n is a positive integer greater than 1) frame period FRMn−1 and an n$^{th}$ frame period FRMn, the emission-off ratio AOR of the n−1$^{th}$ frame period FRMn−1 and the emission-off ratio AOR of the n$^{th}$ frame period FRMn may be equal, and the emission cycle CYC of the n−1$^{th}$ frame period FRMn−1 and the emission cycle CYC of the n$^{th}$ frame period FRMn may be different. For example, the emission-off ratio AOR of the n−1$^{th}$ frame period FRMn−1 and the emission-off ratio AOR of the n$^{th}$ frame period FRMn may be 12%. Further, the luminance LUMn−1 of the n−1$^{th}$ frame period FRMn−1 and the luminance LUMn of the n$^{th}$ frame period FRMn may be equal. For example, the luminance LUMn−1 of the n−1$^{th}$ frame period FRMn−1 and the luminance LUMn of the n$^{th}$ frame period FRMn may be about 80 nits.

As shown in FIG. 7, when the emission cycle CYC increases from 1 to 12 between the n−1$^{th}$ frame period FRMn−1 and the n$^{th}$ frame period FRMn, a frame corresponding period FRM' corresponding to the length of one frame period and including emission periods with the sum of lengths greater than the sum of the length of the emission period of the n−1$^{th}$ frame period FRMn−1 and the lengths of the emission periods of the n$^{th}$ frame period FRMn may exist, and the luminance LUM_H of the frame corresponding period FRM' may be higher than the luminance LUMn−1 of the n−1$^{th}$ frame period FRMn−1 and the luminance LUMn of the n$^{th}$ frame period FRMn. For example, the luminance LUM_H of the frame corresponding period FRM' may be about 81 nits. In this case, flashing corresponding to an increase in luminance of the image may occur between the n−1$^{th}$ frame period FRMn−1 and the n$^{th}$ frame period FRMn.

As shown in FIG. 8, when the emission cycle CYC decreases from 12 to 1 between the n−1$^{th}$ frame period FRMn−1 and the n$^{th}$ frame period FRMn, a frame corresponding period FRM' corresponding to the length of one frame period and including emission periods with the sum of lengths less than the sum of the lengths of the emission periods of the n−1$^{th}$ frame period FRMn−1 and the length of the emission period of the n$^{th}$ frame period FRMn may exist, and the luminance LUM_H of the frame corresponding period FRM' may be lower than the luminance LUMn−1 of the n−1$^{th}$ frame period FRMn−1 and the luminance LUMn of the n$^{th}$ frame period FRMn. For example, the luminance LUM_H of the frame corresponding period FRM' may be about 79 nits. In this case, flashing corresponding to a decrease in luminance of the image may occur between the n−1$^{th}$ frame period FRMn−1 and the n$^{th}$ frame period FRMn.

Figure 9:
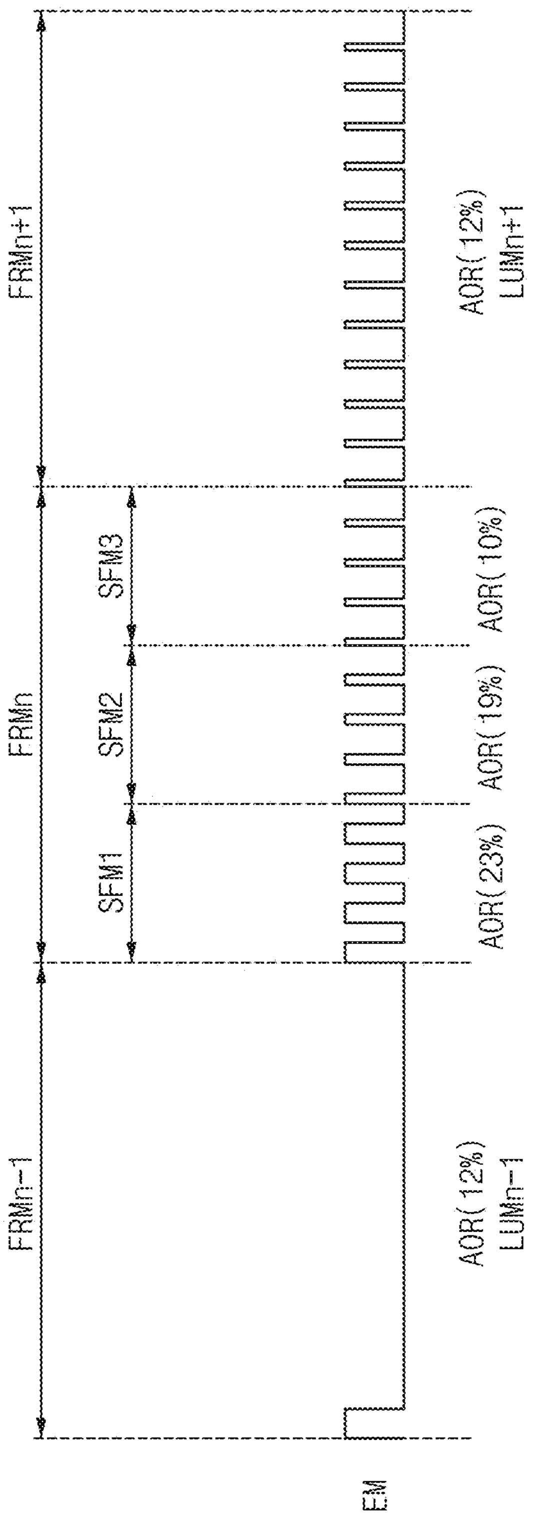
FIGS. 9 and 10 are views for describing a change in emission cycle according to an embodiment.
Figure 10:
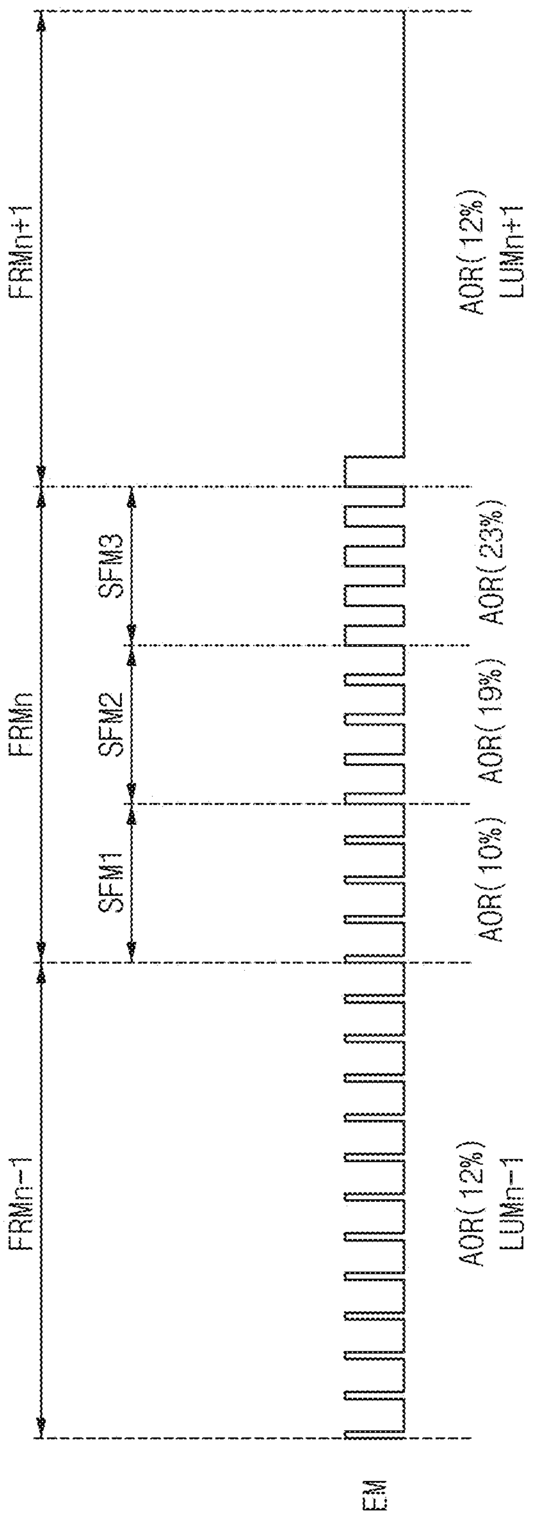

FIGS. 9 and 10 are views for describing a change in emission cycle CYC according to an embodiment.

Referring to FIGS. 9 and 10, when the emission cycle CYC changes between the n−1$^{th}$ frame period FRMn−1 and the n+1$^{th}$ frame period FRMn+1, the emission cycle CYC of one of the n−1$^{th}$ frame period FRMn−1 and the n+1$^{th}$ frame period FRMn+1 may be 1, and the emission cycle CYC of another of the n−1$^{th}$ frame period FRMn−1 and the n+1$^{th}$ frame period FRMn+1 may be 12, 16, 24, or 32. An embodiment in which the emission cycle CYC of the frame period with the larger emission cycle CYC among the n−1$^{th}$ frame period FRMn−1 and the n+1$^{th}$ frame period FRMn+1 is 12 is shown in FIGS. 9 and 10, the present disclosure is not limited thereto. For example, in an embodiment, the emission cycle CYC of the frame period with the larger emission cycle CYC among the n−1$^{th}$ frame period FRMn−1 and the n+1$^{th}$ frame period FRMn+1 may be 16, 24, or 32.

The n$^{th}$ frame period FRMn (or buffer frame period) between the n−1$^{th}$ frame period FRMn−1 and the n+1$^{th}$ frame period FRMn+1 in which the emission cycles CYC are different and the emission-off ratios AOR are equal may include first to m$^{th}$ (where m is a positive integer greater than 1) sub-frame periods having different emission-off ratios AOR. For example, the emission-off ratio AOR of the n−1$^{th}$ frame period FRMn−1 and the emission-off ratio AOR of the n+1$^{th}$ frame period FRMn+1 may be 12%. Further, the luminance LUMn−1 of the n−1$^{th}$ frame period FRMn−1 and the luminance LUMn+1 of the n+1$^{th}$ frame period FRMn+1 may be equal. For example, the luminance LUMn−1 of the n−1$^{th}$ frame period FRMn−1 and the luminance LUMn+1 of the n+1$^{th}$ frame period FRMn+1 may be about 80 nits.

The emission cycle CYC of the n$^{th}$ frame period FRMn may be equal to the emission cycle CYC of the frame period with the larger emission cycle CYC among the n−1$^{th}$ frame period FRMn−1 and the n+1$^{th}$ frame period FRMn+1. For example, the emission cycle CYC of the n$^{th}$ frame period FRMn may be 12.

In an embodiment, the n$^{th}$ frame period FRMn may include three first to third sub-frame periods SFM1, SFM2, and SFM3. However, the present disclosure is not limited thereto. For example, in an embodiment, the n$^{th}$ frame period FRMn may include two or four or more sub-frame periods.

As shown in FIG. 9, when the emission cycle CYC of the n+1$^{th}$ frame period FRMn+1 is greater than the emission cycle CYC of the n−1$^{th}$ frame period FRMn−1, the emission-off ratios AOR may decrease from the first sub-frame period to the m$^{th}$ sub-frame period. For example, the emission-off ratio AOR of the second sub-frame period SFM2 may be less than the emission-off ratio AOR of the first sub-frame period SFM1, and the emission-off ratio AOR of the third sub-frame period SFM3 may be less than the emission-off ratio AOR of the second sub-frame period SFM2. In an embodiment, the emission-off ratio AOR of the first sub-frame period may be greater than the emission-off ratio AOR of the n−1$^{th}$ frame period FRMn−1. Further, the emission-off ratio AOR of the m$^{th}$ sub-frame period may be less than the emission-off ratio AOR of the n+1$^{th}$ frame period FRMn+1. For example, the emission-off ratio AOR of the first sub-frame period SFM1 may be 23%, the emission-off ratio AOR of the second sub-frame period SFM2 may be 19%, and the emission-off ratio AOR of the third sub-frame period SFM3 may be 10%.

As shown in FIG. 10, when the emission cycle CYC of the n+1$^{th}$ frame period FRMn+1 is less than the emission cycle CYC of the n−1$^{1'}$ frame period FRMn−1, the emission-off ratios AOR may increase from the first sub-frame period to the m$^{th}$ sub-frame period. For example, the emission-off ratio AOR of the second sub-frame period SFM2 may be greater than the emission-off ratio AOR of the first sub-frame period SFM1, and the emission-off ratio AOR of the third sub-frame period SFM3 may be greater than the emission-off ratio AOR of the second sub-frame period SFM2. In an embodiment, the emission-off ratio AOR of the m$^{th}$ sub-frame period may be greater than the emission-off ratio AOR of the n+1$^{th}$ frame period FRMn+1.

Further, the emission-off ratio AOR of the first sub-frame period may be less than the emission-off ratio AOR of the n−1$^{th}$ frame period FRMn−1. For example, the emission-off ratio AOR of the first sub-frame period SFM1 may be 10%, the emission-off ratio AOR of the second sub-frame period SFM2 may be 19%, and the emission-off ratio AOR of the third sub-frame period SFM3 may be 23%.

In an embodiment, when the emission cycle CYC changes between the n−1$^{th}$ frame period FRMn−1 and the n+1$^{th}$ frame period FRMn+1, the buffer frame FRMn including the sub-frame periods having different emission-off ratios AOR may be inserted between the n−1$^{th}$ frame period FRMn−1 and the n+1$^{th}$ frame period FRMn+1. As a result, flashing may be prevented from occurring when the emission cycle CYC changes.

Figure 11:
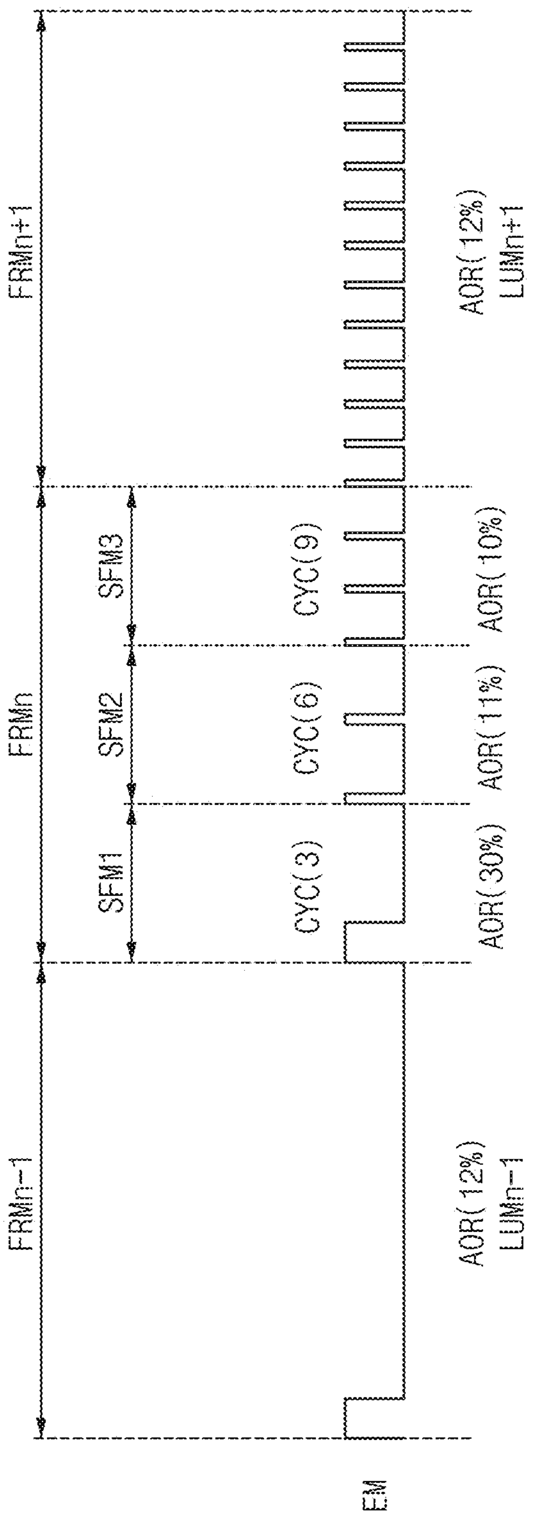
FIGS. 11 and 12 are views for describing a change in emission cycle according to an embodiment.
Figure 12:
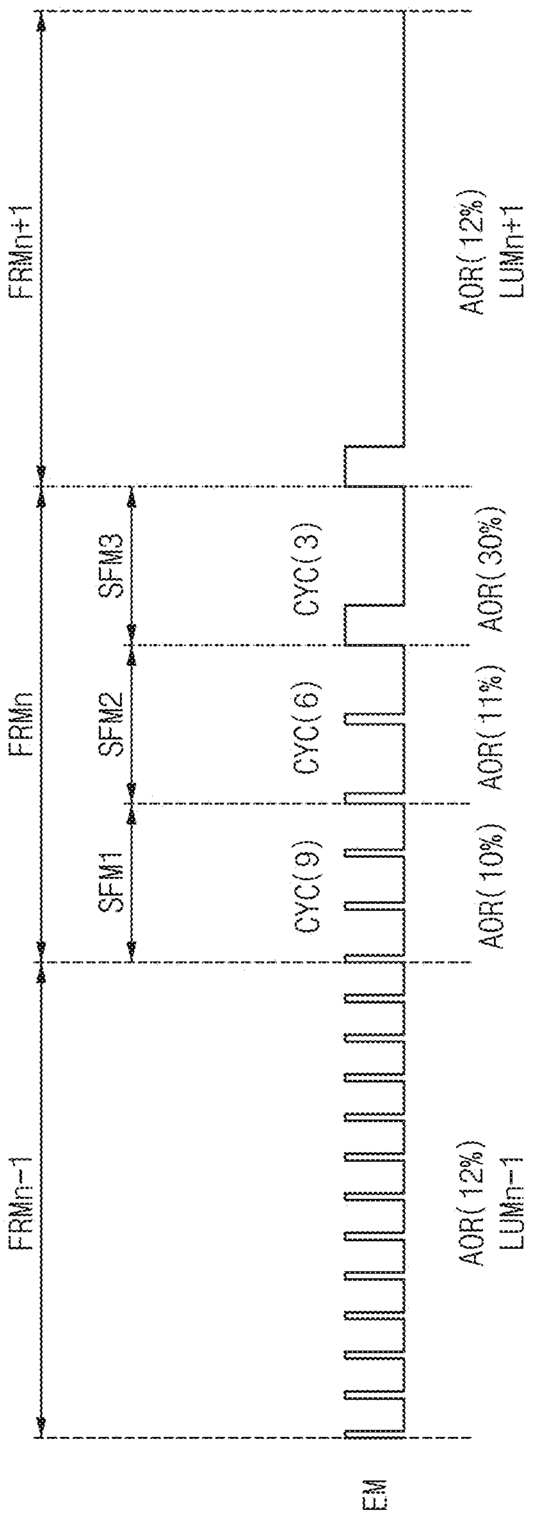

FIGS. 11 and 12 are views for describing a change in emission cycle CYC according to an embodiment.

For convenience of explanation, descriptions of the change of the emission cycle CYC described with reference to FIGS. 11 and 12, which are substantially the same as or similar to the change of the emission cycle CYC described with reference to FIGS. 9 and 10, will be omitted.

Referring to FIGS. 11 and 12, the emission-off ratios AOR of the first to m$^{th}$ sub-frame periods may be different, and the emission cycles CYC of the first to m$^{th}$ sub-frame periods may be different. The emission cycle CYC of the n$^{th}$ frame period FRMn may be between the emission cycle CYC of the n−1$^{th}$ frame period FRMn−1 and the emission cycle CYC of the n+1$^{th}$ frame period FRMn+1. For example, the emission cycle CYC of the n$^{th}$ frame period FRMn may be greater than 1 and less than 12.

As shown in FIG. 11, when the emission cycle CYC of the n+1$^{th}$ frame period FRMn+1 is greater than the emission cycle CYC of the n−1$^{th}$ frame period FRMn−1, the emission-off ratios AOR may decrease and the emission cycles CYC may increase from the first sub-frame period to the m$^{th}$ sub-frame period. For example, the emission cycle CYC of the second sub-frame period SFM2 may be greater than the emission cycle CYC of the first sub-frame period SFM1, and the emission cycle CYC of the third sub-frame period SFM3 may be greater than the emission cycle CYC of the second sub-frame period SFM2. The emission cycle CYC of the sub-frame period may be a value obtained by multiplying the number of discontinuous emission periods included in the sub-frame period by the number of sub-frame periods included in the n$^{th}$ frame period FRMn. In an embodiment, the emission-off ratio AOR of the first sub-frame period may be greater than the emission-off ratio AOR of the n−1$^{th}$ frame period FRMn−1, and the emission-off ratio AOR of the m$^{th}$ sub-frame period may be less than the emission-off ratio AOR of the n+1$^{th}$ frame period FRMn+1. Further, the emission cycle CYC of the first sub-frame period may be greater than the emission cycle CYC of the n−1$^{th}$ frame period FRMn−1, and the emission cycle CYC of the m$^{th}$ sub-frame period may be less than the emission cycle CYC of the n+1$^{th}$ frame period FRMn+1. For example, the emission-off ratio AOR of the first sub-frame period SFM1 may be 30%, the emission-off ratio AOR of the second sub-frame period SFM2 may be 11%, and the emission-off ratio AOR of the third sub-frame period SFM3 may be 10%. Further, the emission cycle CYC of the first sub-frame period SFM1 may be 3, the emission cycle CYC of the second sub-frame period SFM2 may be 6, and the emission cycle CYC of the third sub-frame period SFM3 may be 9.

As shown in FIG. 12, when the emission cycle CYC of the n+1$^{th}$ frame period FRMn+1 is less than the emission cycle CYC of the n−1$^{th}$ frame period FRMn−1, the emission-off ratios AOR may increase and the emission cycles CYC may decrease from the first sub-frame period to the m$^{th}$ sub-frame period. For example, the emission cycle CYC of the second sub-frame period SFM2 may be less than the emission cycle CYC of the first sub-frame period SFM1, and the emission cycle CYC of the third sub-frame period SFM3 may be less than the emission cycle CYC of the second sub-frame period SFM2. In an embodiment, the emission-off ratio AOR of the first sub-frame period may be less than the emission-off ratio AOR of the n−1$^{th}$ frame period FRMn−1, and the emission-off ratio AOR of the m$^{th}$ sub-frame period may be greater than the emission-off ratio AOR of the n+1$^{th}$ frame period FRMn+1. Further, the emission cycle CYC of the first sub-frame period may be less than the emission cycle CYC of the n−1$^{th}$ frame period FRMn−1, and the emission cycle CYC of the m$^{th}$ sub-frame period may be greater than the emission cycle CYC of the n+1$^{th}$ frame period FRMn+1. For example, the emission-off ratio AOR of the first sub-frame period SFM1 may be 10%, the emission-off ratio AOR of the second sub-frame period SFM2 may be 11%, and the emission-off ratio AOR of the third sub-frame period SFM3 may be 30%. Further, the emission cycle CYC of the first sub-frame period SFM1 may be 9, the emission cycle CYC of the second sub-frame period SFM2 may be 6, and the emission cycle CYC of the third sub-frame period SFM3 may be 3.

In an embodiment, when the emission cycle CYC changes between the n−1$^{th}$ frame period FRMn−1 and the n+1$^{th}$ frame period FRMn+1, the buffer frame FRMn including the sub-frame periods having different emission-off ratios AOR and different emission cycles CYC may be inserted between the n−1$^{th}$ frame period FRMn−1 and the n+1$^{th}$ frame period FRMn+1. As a result, flashing may be prevented from occurring when the emission cycle CYC changes.

Figure 13:
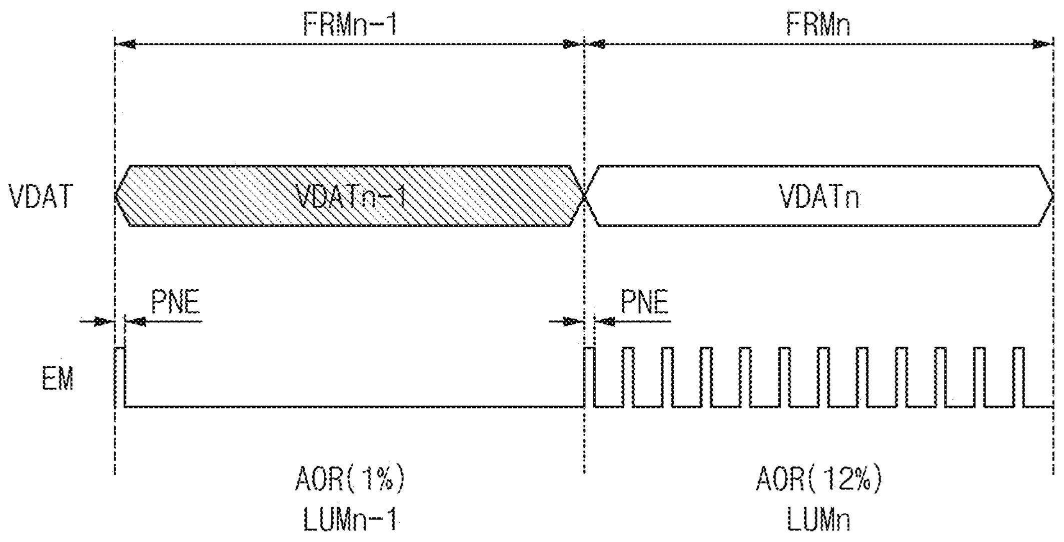
FIGS. 13 and 14 are views for describing a change in emission cycle according to an embodiment.
Figure 14:
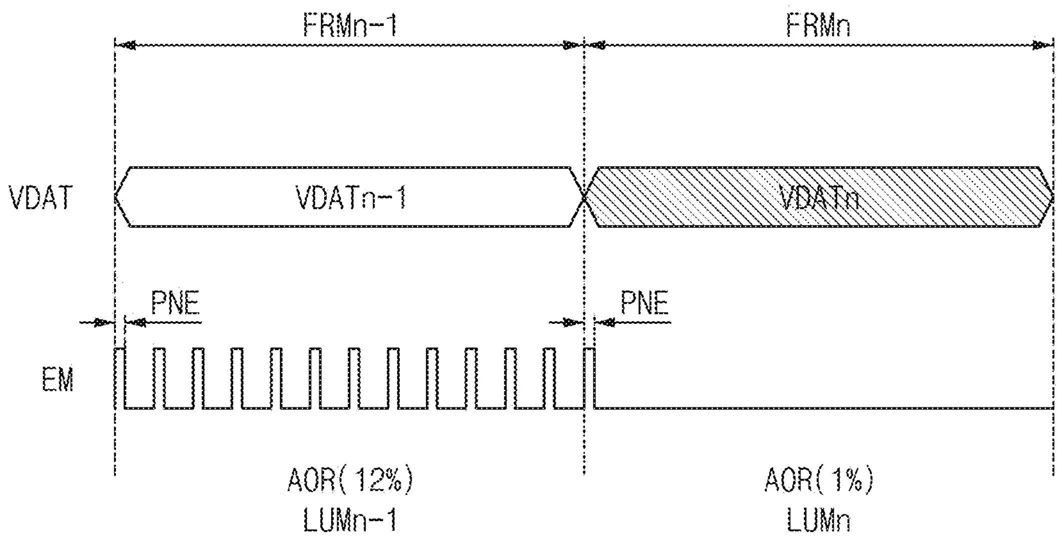

FIGS. 13 and 14 are views for describing a change in emission cycle CYC according to an embodiment.

Referring to FIGS. 13 and 14, when the emission cycle CYC changes between the n−1$^{th}$ frame period FRMn−1 and the n$^{th}$ frame period FRMn, the emission cycle CYC of one of the n−1$^{th}$ frame period FRMn−1 and the n$^{th}$ frame period FRMn may be 1, and the emission cycle CYC of another of the n−1$^{th}$ frame period FRMn−1 and the n$^{th}$ frame period FRMn may be 12, 16, 24, or 32.

An embodiment in which the emission cycle CYC of the frame period with the larger emission cycle CYC among the n−1$^{th}$ frame period FRMn−1 and the n$^{th}$ frame period FRMn is 12 is shown in FIGS. 13 and 14, but the present disclosure is not limited thereto. For example, in an embodiment, the emission cycle CYC of the frame period with the larger emission cycle CYC among the n−1$^{th}$ frame period FRMn−1 and the n$^{th}$ frame period FRMn may be 16, 24, or 32. Further, the luminance LUMn−1 of the n−1$^{th}$ frame period FRMn−1 and the luminance LUMn of the n$^{th}$ frame period FRMn may be equal. For example, the luminance LUMn−1 of the n−1$^{th}$ frame period FRMn−1 and the luminance LUMn of the n$^{th}$ frame period FRMn may be about 80 nits.

The length of the non-emission period PNE of a first frame period (one of the n−1$^{th}$ frame period FRMn−1 and the n$^{th}$ frame period FRMn) may be substantially equal to the length of the non-emission period PNE of a second frame period (another of the n−1$^{th}$ frame period FRMn−1 and the n$^{th}$ frame period FRMn) adjacent to the first frame period. FIG. 13 shows that the first frame period and the second frame period are the n−1$^{th}$ frame period FRMn−1 and the n$^{th}$ frame period FRMn, respectively, and FIG. 14 shows that the first frame period and the second frame period are the n$^{th}$ frame period FRMn and the n−1$^{th}$ frame period FRMn−1, respectively.

The first frame period may have a first emission cycle and a first emission-off ratio, and the second frame period may have a second emission cycle greater than the first emission cycle and a second emission-off ratio greater than the first emission-off ratio. The first emission-off ratio may be the minimum emission-off ratio.

As shown in FIG. 13, when the emission cycle CYC of the $n^{th}$ frame period FRMn is greater than the emission cycle CYC of the $n-1^{th}$ frame period FRMn−1, the emission-off ratio AOR of the $n-1^{th}$ frame period FRMn−1 may be the minimum emission-off ratio, and the magnitude of the data voltage VDATn−1 of the $n-1^{th}$ frame period FRMn−1 may be less than the magnitude of the data voltage VDATn of the $n^{th}$ frame period FRMn. For example, the emission-off ratio AOR of the $n-1^{th}$ frame period FRMn−1 may be 1%, and the emission-off ratio AOR of the $n^{th}$ frame period FRMn may be 12%.

As shown in FIG. 14, when the emission cycle CYC of the $n^{th}$ frame period FRMn is less than the emission cycle CYC of the $n-1^{th}$ frame period FRMn−1, the emission-off ratio AOR of the $n^{th}$ frame period FRMn may be the minimum emission-off ratio, and the magnitude of the data voltage VDATn of the $n^{th}$ frame period FRMn may be less than the magnitude of the data voltage VDATn−1 of the $n-1^{th}$ frame period FRMn−1. For example, the emission-off ratio AOR of the $n-1^{th}$ frame period FRMn−1 may be 12%, and the emission-off ratio AOR of the $n^{th}$ frame period FRMn may be 1%.

In an embodiment, when the emission cycle CYC changes between the $n-1^{th}$ frame period FRMn−1 and the $n^{th}$ frame period FRMn, the length of the one non-emission period PNE of the $n-1^{th}$ frame period FRMn−1 and the length of the one non-emission period PNE of the $n^{th}$ frame period FRMn may be substantially equal, and the length of the first non-emission period PNE of the $n-1^{th}$ frame period FRMn−1 and the length of the first non-emission period PNE of the $n^{th}$ frame period FRMn may be substantially equal. As a result, flashing may be prevented from occurring when the emission cycle CYC changes.

Figure 15:
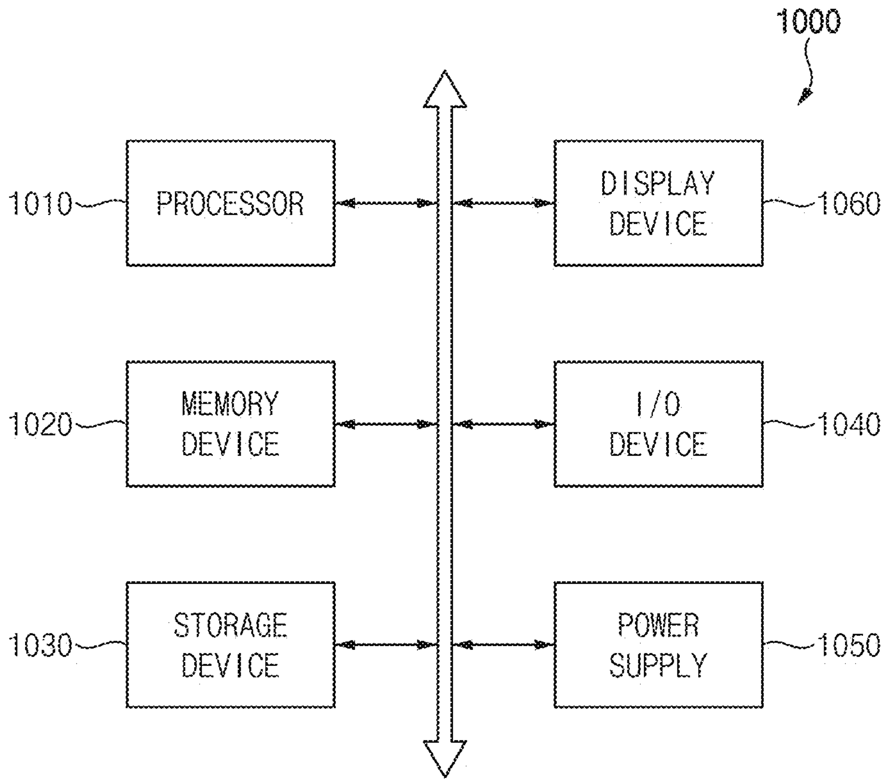
FIG. 15 is a block diagram showing an electronic apparatus according to an embodiment.

FIG. 15 is a block diagram showing an electronic apparatus 1000 according to an embodiment.

Referring to FIG. 15, an electronic apparatus 1000 may include a processor 1010, a memory device 1020, a storage device 1030, an input/output ("I/O") device 1040, a power supply 1050, and a display device 1060. The display device 1060 may correspond to the display device 100 in FIG. 1. The electronic apparatus 1000 may further include a plurality of ports for communicating with, for example, a video card, a sound card, a memory card, a universal serial bus ("USB") device, etc.

The processor 1010 may perform calculations or tasks. In an embodiment, the processor 1010 may be, for example, a microprocessor, a central processing unit ("CPU"), or the like. The processor 1010 may be coupled to other components via, for example, an address bus, a control bus, a data bus, or the like. In an embodiment, the processor 1010 may be coupled to an extended bus such as a peripheral component interconnection ("PCI") bus. In an embodiment, the processor 1010 may provide input image data (e.g., IMD1 in FIG. 1) and a control signal (e.g., CNT in FIG. 1) to the display device 1060.

The memory device 1020 may store data for operations of the electronic apparatus 1000. In an embodiment, the memory device 1020 may include a non-volatile memory device such as, for example, an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as, for example, a dynamic random access memory ("DRAM") device, a static random access memory ("SRAM") device, a mobile DRAM device, etc.

The storage device 1030 may include, for example, a solid-state drive ("SSD") device, a hard disk drive ("HDD") device, a CD-ROM device, or the like. The I/O device 1040 may include an input device such as, for example, a keyboard, a keypad, a touchpad, a touchscreen, a mouse device, etc., and an output device such as, for example, a speaker, a printer, etc. The power supply 1050 may supply power utilized for the operation of the electronic apparatus 1000. The display device 1060 may be coupled to other components via the buses or other communication links.

The display device according to embodiments of the present disclosure may be applied to a display device included in, for example, a computer, a notebook, a mobile phone, a smart phone, a smart pad, a smart watch, a PMP, a PDA, an MP3 player, or the like.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A display device, comprising:

a display panel including a pixel and an emission line connected to the pixel;

an emission driver which provides an emission signal to the emission line, wherein the emission signal defines discontinuous emission periods and non-emission periods during a frame period among a plurality of frame periods; and a controller which determines an emission cycle corresponding to a number of the discontinuous emission periods during the frame period and an emission-off ratio which is a ratio of a sum of the non-emission periods to the frame period, wherein the plurality of frame periods includes an $n-1^{th}$ frame period, an $n+1^{th}$ frame period, and an $n^{th}$ frame period between the $n-1^{th}$ frame period and the $n+1^{th}$ frame period, wherein the emission cycle of the $n-1^{th}$ frame period is different from the emission cycle of the $n+1^{th}$ frame period, the emission-off ratio of the $n-1^{th}$ frame period is equal to the emission-off ratio of the $n+1^{th}$ frame period, the $n^{th}$ frame period includes first to $m^{th}$ sub-frame periods having different emission-off ratios and each of the first to $m^{th}$ $n^{th}$ sub-frame periods includes at least two pulses of the emission signal, wherein each of m and n is a positive integer greater than 1, wherein the emission-off ratios of the first to $m^{th}$ sub-frame periods include an emission-off ratio greater than the emission off ratio of the $n-1^{th}$ frame period and an emission-off ratio less than the emission-off ratio of the n-frame period.

2. The display device of claim 1, wherein the emission-off ratios of the first to $m^{th}$ sub-frame periods decrease from the first sub-frame period to the $m^{th}$ sub-frame period when the emission cycle of the $n+1^{th}$ frame period is greater than the emission cycle of the $n-1^{th}$ frame period.

3. The display device of claim 2, wherein the emission-off ratio of the first sub-frame period is greater than the emission-off ratio of the $n-1^{th}$ frame period.

4. The display device of claim 1, wherein the emission-off ratios of the first to $m^{th}$ sub-frame periods increase from the first sub-frame period to the $m^{th}$ sub-frame period when the emission cycle of the $n+1^{th}$ frame period is less than the emission cycle of the n−1th frame period.

5. The display device of claim 4, wherein the emission-off ratio of the $m^{th}$ sub-frame period is greater than the emission-off ratio of the $n+1^{th}$ frame period.

6. The display device of claim 1, wherein the emission cycle of the $n^{th}$ frame period is equal to the emission cycle of a frame period with the greater emission cycle among the $n-1^{th}$ frame period and the $n+1^{th}$ frame period.

7. The display device of claim 1, wherein emission cycles of the first to $m^{th}$ sub-frame periods are different within the $n^{th}$ frame period.

8. The display device of claim 7, wherein the emission cycles of the first to $m^{th}$ sub-frame periods increase from the first sub-frame period to the $m^{th}$ sub-frame period when the emission cycle of the $n+1^{th}$ frame period is greater than the emission cycle of the n−1th frame period.

9. The display device of claim 8, wherein the emission-off ratio of the first sub-frame period is greater than the emission-off ratio of the $n-1^{th}$ frame period.

10. The display device of claim 8, wherein the emission cycle of the first sub-frame period is greater than the emission cycle of the $n-1^{th}$ frame period, and the emission cycle of the $m^{th}$ sub-frame period is less than the emission cycle of the $n+1^{th}$ frame period.

11. The display device of claim 7, wherein the emission cycles of the first to $m^{th}$ sub-frame periods decrease from the first sub-frame period to the $m^{th}$ sub-frame period when the emission cycle of the $n+1^{th}$ frame period is less than the emission cycle of the $n-1^{th}$ frame period.

12. The display device of claim 11, wherein the emission-off ratio of the $m^{th}$ sub-frame period is greater than the emission-off ratio of the $n+1^{th}$ frame period.

13. The display device of claim 11, wherein the emission cycle of the first sub-frame period is less than the emission cycle of the $n-1^{th}$ frame period, and the emission cycle of the $m^{th}$ sub-frame period is greater than the emission cycle of the $n+1^{th}$ frame period.

14. The display device of claim 7, wherein the emission cycle of the $n^{th}$ frame period is between the emission cycle of the $n-1^{th}$ frame period and the emission cycle of the $n+1^{th}$ frame period.

15. The display device of claim 1, wherein the emission cycle of one of the $n-1^{th}$ frame period and the $n+1^{th}$ frame period is 1, and the emission cycle of another of the $n-1^{th}$ frame period and the $n+1^{th}$ frame period is 12, 16, 24, or 32.

16. The display device of claim 1, wherein luminances of the $n-1^{th}$ frame period and the $n+1^{th}$ frame period are equal.

17. An electronic apparatus, comprising:

a display panel including a pixel and an emission line connected to the pixel;

an emission driver which provides an emission signal to the emission line, wherein the emission signal defines discontinuous emission periods and non-emission periods during a frame period among a plurality of frame periods;

a controller which determines an emission cycle corresponding to a number of the discontinuous emission periods during the frame period and an emission-off ratio which is a ratio of a sum of the non-emission periods to the frame period, wherein a first frame period has a first emission cycle, wherein, when a second frame period adjacent to the first frame period has a second emission cycle greater than the first emission cycle, the controller sets a length of a non-emission period of the first frame period equal to a length of a non-emission period of the second frame period, and sets a magnitude of a data voltage provided to the pixel during the first frame period to be less than a magnitude of a data voltage provided to the pixel during the second frame period such that luminances of the first frame period and the second frame period are equal.

18. The electronic apparatus of claim 17, wherein the first frame period has a first emission-off ratio which is a minimum emission-off ratio, and the second frame period has a second emission-off ratio greater than the first emission-off ratio.

19. The electronic apparatus of claim 17, wherein the first emission cycle is 1, and the second emission cycle is 12, 16, 24, or 32.

* * * * *